United States Patent
Manimaran et al.

(10) Patent No.: US 7,432,332 B2
(45) Date of Patent: Oct. 7, 2008

(54) POLYMER HALOGENATION PROCESS WITH CATALYST RECOVERY

(75) Inventors: Thanikavelu Manimaran, Baton Rouge, LA (US); Alvin E. Harkins, Jr., Baton Rouge, LA (US)

(73) Assignee: Albermarle Corporation, Richmond, VA (US)

( * ) Notice: Subject to any disclaimer, the term of this patent is extended or adjusted under 35 U.S.C. 154(b) by 399 days.

(21) Appl. No.: 11/390,023

(22) Filed: Mar. 24, 2006

(65) Prior Publication Data

US 2006/0223949 A1 Oct. 5, 2006

Related U.S. Application Data

(60) Provisional application No. 60/666,947, filed on Mar. 31, 2005.

(51) Int. Cl.
*C08F 8/18* (2006.01)

(52) U.S. Cl. .................... 525/355; 525/333.4; 525/357

(58) Field of Classification Search ................ 525/355, 525/357
See application file for complete search history.

(56) References Cited

U.S. PATENT DOCUMENTS

| | | | |
|---|---|---|---|
| 3,806,589 A | 4/1974 | Becher et al. | |
| 4,352,909 A | 10/1982 | Barda et al. | |
| 4,411,874 A * | 10/1983 | Lee ............................ | 423/87 |
| 4,832,873 A * | 5/1989 | Favstritsky et al. ........... | 252/601 |
| 5,532,322 A | 7/1996 | Kadono et al. | |
| 5,726,252 A | 3/1998 | Gill et al. | |
| 6,992,148 B2 | 1/2006 | Manimaran et al. | |
| 2002/0035214 A1 | 3/2002 | Gill et al. | |

FOREIGN PATENT DOCUMENTS

| | | | |
|---|---|---|---|
| EP | 0034758 A | 9/1981 | |
| EP | 0047549 A | 3/1982 | |
| EP | 0201411 A | 11/1986 | |

\* cited by examiner

*Primary Examiner*—Bernard Lipman
(74) *Attorney, Agent, or Firm*—Jeremy J. Kliebert

(57) ABSTRACT

The present invention relates to a method for recovering antimony catalysts wherein the formation of insoluble solids is reduced.

26 Claims, No Drawings

POLYMER HALOGENATION PROCESS WITH CATALYST RECOVERY

REFERENCE TO RELATED APPLICATION

This application claims priority to U.S. Provisional Patent Application No. 60/666,947 filed Mar. 31, 2005, the disclosure of which is herein incorporated by reference in its entirety.

FIELD OF THE INVENTION

The present invention relates to a method for recovering antimony catalysts from an aqueous solution. More particularly, the present invention relates to a method for recovering antimony catalysts wherein the formation of insoluble solids is reduced.

BACKGROUND OF THE INVENTION

It is known to produce brominated styrenic polymers by brominating a styrenic polymer in a suitable solvent using bromine chloride and an antimony trihalide catalyst. See in this connection U.S. Pat. No. 4,352,909 to Barda et al., and U.S. Pat. No. 5,723,549 to Dever et al., the full disclosures of which are incorporated herein by reference. One of the products made in this way is a commercial product available under the trademark Pyro-Chek 68PB.

In order to minimize contamination of the brominated styrenic polymer product by antimony catalyst residues, it has been the practice to subject the bromination reaction mass to an aqueous work up and to precipitate the antimony catalyst residues from the aqueous phase first as the oxychloride and then as the sulfide. In order to operate the process on a more efficient cost-effectiveness basis, it is desired to recover as much of the antimony catalyst residues as possible and to recycle them use as catalyst in the bromination step. It would be especially advantageous if the recovered product could be reused as catalyst in the process without adversely affecting either the bromination reaction or the properties of the brominated flame retardant product formed therewith.

However, antimony catalyst recovery processes and halogenation processes employing the same have several drawbacks, including, but not limited to, the formation of solids that are insoluble in the solvents and/or acids used in the halogenation processes. These solids, typically higher oxides of antimony such as antimony (IV) and (V) oxides cause many processing problems such as, for example, clogging processing equipment, etc. and also cause the loss of a portion of the costly antimony. For example, U.S. Pat. No. 6,994,148, which is incorporated herein by reference, discloses an antimony trihalide catalyst recovery process whereby antimony halide catalyst residues are recovered from a styrene polymer bromination process. This recovery is facilitated by mixing the reaction mass formed in the bromination process with hydrochloric acid, hydrobromic acid, or both, at least once such that the antimony halide catalyst residues are thereby recovered in an acidic aqueous phase. However, the inventors hereof have discovered that this process also has some of the drawbacks discussed above.

Thus, there exists a need in the art for antimony catalyst recovery processes that overcomes these and other drawbacks of existing recovery processes.

THE INVENTION

The present invention relates to a method for recovering antimony halide catalysts comprising:

Adding, to a mixture comprising: (i) aqueous hydrochloric acid, (ii) soluble antimony values, and (iii) at least one antimony value insoluble in the aqueous hydrochloric acid, aqueous hydrobromic acid, gaseous hyrdrobromic acid, or mixtures thereof in an amount effective at converting at least a portion of the insoluble antimony values into at least one antimony value that is soluble in the aqueous hydrochloric acid. The at least one insoluble antimony value is selected from (i) antimony (IV) oxide, (ii) antimony (V) oxide, (iii) other antimony oxides, (iv) oxyhalide compounds, and mixtures of (i)-(iv).

In one embodiment, the present invention relates to a process for brominating a styrenic polymer comprising:

a) contacting, in a bromination reaction zone, in the presence of an antimony halide catalyst and an organic solvent under effective bromination conditions, a styrenic polymer with an effective amount of bromine chloride thereby forming a reaction mass comprising at least a brominated styrenic polymer and antimony halide catalyst residues;

b) extracting at least a portion of the antimony catalyst residues from the reaction mass by contacting the reaction mass with an effective amount of aqueous hydrochloric acid thereby forming an acidic aqueous phase comprising antimony halide catalyst residues and aqueous hydrochloric acid and an organic phase comprising brominated styrenic polymer;

c) separating the acidic aqueous phase from the organic phase;

d) optionally, concentrating the acidic aqueous phase; and solvent exchanging under effective solvent exchange conditions the acidic aqueous phase with a solvent exchange solvent, thereby forming a solvent exchanged solution comprising antimony halide catalyst and the solvent exchange solvent, wherein aqueous hydrobromic acid, gaseous hydrobromic acid, or mixtures thereof ("HBr") is added to the acidic aqueous phase at a point after the extraction step in an amount ranging from about 0.1 to about 5 moles of HBr per mole of antimony present in the antimony halide catalyst used in the bromination reaction zone, thereby converting at least a portion of any insoluble antimony values into at least one antimony value that is soluble in the hydrochloric acid.

DETAILED DESCRIPTION OF THE INSTANT INVENTION

The present invention is directed to a method for recovering antimony halide catalysts. The method comprises adding aqueous hydrobromic acid ("HBr"), gaseous HBr, or mixtures thereof to a mixture comprising aqueous hydrochloric acid, soluble antimony values, and at least one antimony value insoluble in the aqueous hydrochloric acid selected from (i) antimony (IV) oxide, (ii) antimony (V) oxide, (iii) other antimony oxides, (iv) oxyhalide compounds, and mixtures of (i)-(iv). It should be noted that the inventors hereof, while not wishing to be bound by theory, believe that in preferred embodiments, the at least one insoluble antimony value is essentially antimony (IV) oxide, antimony (V) oxide, and mixtures thereof. The insoluble antimony values cause many processing problems such as, for example, clogging processing equipment, loss of the costly antimony metal, etc. The inventors hereof have discovered that the addition, as described herein, of aqueous HBr, gaseous HBr, and mixtures thereof, to the mixture beneficially converts at least a portion, preferably substantially all, of the at least one antimony value insoluble in the aqueous hydrochloric acid into at least one antimony value soluble in the aqueous hydrochloric acid. It is believed that the higher oxides of antimony such as, for example, antimony (IV) oxide, antimony (V) oxide, and mixtures thereof are converted into antimony values that are soluble in the aqueous hydrochloric acid, preferably antimony (III) oxides, halides, oxyhalides, and mixtures thereof. It should be noted that the use of HBr herein without specifically stating "aqueous" or "gaseous" is meant to refer to the group including aqueous HBr, gaseous HBr, and mixtures thereof.

To effect conversion of at least a portion of the insoluble antimony values, an effective amount of HBr, preferably aqueous HBr, is added to the mixture. By effective amount, it is meant that amount of HBr effective at converting at least a portion of the at least one insoluble antimony value into at least one antimony value that is soluble in the hydrochloric acid. An effective amount of HBr is typically about 0.1 to about 5 moles of HBr per mole of antimony present in the mixture, preferably about 2.0 to about 3.0.

Preferred embodiments utilize aqueous HBr. Aqueous HBr suitable for use herein contains hydrobromic acid in an amount ranging from about 10 wt. % to about 48 wt. %, based on the total weight of the aqueous HBr, preferably from about 20 wt. % to about 48 wt. %.

The conditions under which the HBr is added to the mixture are not critical to the present invention and can include any conditions under which the HBr reacts effectively with the at least one insoluble antimony value to form at least one antimony value soluble in the aqueous hydrochloric acid. Non-limiting examples of suitable conditions include temperatures from about 0° C. to about 50° C. and pressures from 0.5 to 1.5 atm. Preferred conditions include atmospheric pressure and ambient temperature.

The mixture to which the HBr is added is typically and preferably obtained from a bromination process that employs an antimony halide catalyst. Thus, in one embodiment, the present invention provides for an improved bromination process.

Brominated polystyrene, in this embodiment, is prepared by contacting a styrenic polymer, under effective bromination conditions, with an effective amount of bromine chloride ("BrCl") in the presence of an antimony halide catalyst and at least one organic solvent. This is referred to herein as a "bromination step".

Effective bromination conditions are those conditions under which at least a portion of the styrenic polymer becomes brominated. These conditions generally include temperatures less than 100° C., preferably between about 0° C. and about 75° C., more preferably between about 20° C. and about 50° C. Pressures generally are atmospheric, but super-atmospheric pressures may also be employed. In one embodiment, effective conditions are to be considered those conditions that fall within the above ranges that result in about 2 to about 3.0 moles of bromine per mole of styrene units in the brominated styrenic polymer.

Any catalytic amount of antimony halide catalyst known to be effective at brominating a styrenic polymer may be used in the present invention, and the amount used is not critical. Typical catalytic amounts of antimony halide catalyst range from about 2 wt. % to about 10 wt. %, based on the weight of the styrenic polymer. Antimony halide catalysts suitable for use in the present invention include antimony (III) halide, antimony (IV) halide, antimony (V) halide, and mixtures thereof. Non-limiting examples of antimony-halide catalysts suitable for use herein include $SbCl_5$, $SbCl_3$, $SbBr_3$, $SbClBr_2$, $SbBr_2Cl$, and mixtures thereof. In a preferred embodiment, the antimony halide catalyst is antimony tri-chloride, $SbCl_3$.

An effective amount of bromine chloride is that amount of BrCl necessary to provide at least about 2, preferably at least about 3, bromine atoms per aromatic constituent in the styrenic polymer. On another basis, an effective amount of BrCl is that amount that provides from about 60 to about 70 wt. % bromine in the styrenic polymer chain, based on the weight of the styrenic polymer, preferably about 67 to about 70 wt. %, on the same basis.

The contacting of the styrenic polymer with the antimony halide catalyst is conducted in the presence of an organic solvent. Organic solvents suitable for use herein can be selected from any organic solvents that dissolve at least a portion, preferably substantially all, of the antimony halide catalyst and the polystyrene. It is preferred that the organic solvent be free of carbon-to-carbon unsaturation to prevent bromination of the solvent and/or the unsaturated sites of the styrenic polymer. The organic solvent should be relatively inert and perform its function as a solvent medium in the bromination reaction under effective bromination conditions. Organic solvents that do not contribute to any significant polymer cross-linking during the bromination reaction are preferred. Preferred organic solvents include halogenated, more preferably chlorinated, aliphatic hydrocarbons that are saturated. Non-limiting examples of suitable organic solvents include carbon tetrachloride, bromochloromethane, chloroform, 1,1,2,2-tetrachloroethane, methylene chloride, 1,1,2-trichloroethane, 1,2-dibromoethane, bromochloroethane, ethylene dichloride, the like, and mixtures thereof. It is most preferred that the organic solvent be ethylene dichloride.

The contacting of the styrenic polymer with the BrCl in the presence of the antimony-halide catalyst and at least one organic solvent results in a reaction mass comprising brominated styrenic polymer and antimony halide catalyst residues. In the practice of the present invention, at least a portion of the antimony halide catalyst residues are then extracted from the reaction mass by contacting the reaction mass with an effective amount of aqueous hydrochloric acid. This is sometimes referred to herein as the "extraction step".

By at least a portion of the antimony halide residues, it is meant at least about 50 wt. % of the antimony halide catalyst residues are extracted from the reaction mass, preferably at least about 75 wt. %, more preferably at least about 80 wt. %. In a most preferred embodiment of the instant invention, substantially all of the antimony halide catalyst residues are extracted from the reaction mass.

By effective amount of aqueous hydrochloric acid, it is meant that amount of aqueous hydrochloric acid sufficient to extract at least a portion of the antimony halide catalyst residue from the reaction mass. Typically, effective amounts of aqueous hydrochloric acid are volumetric ratios of aqueous hydrochloric acid to the reaction mass greater than about 2:1.

In some embodiments, the hydrochloric acid used need not be concentrated. For example, the use of dilute aqueous hydrochloric acid, preferably in the range of about 10% to 20 wt. % aqueous hydrochloric acid enables substantially complete extraction and recovery of substantially all of the antimony halide catalyst residues from the reaction mass. However, more dilute or more concentrated aqueous hydrochloric acid may be used. For example, aqueous solutions ranging from about 5 to about 38 wt. % hydrochloric acid can be used.

The extraction step can be carried out in various ways using different types of equipment, and the extraction can be conducted in a single extraction operation, or two or more sequential extractions can be conducted, if so desired. The extraction procedure basically involves intimately mixing an effective amount of aqueous hydrochloric acid with the reaction mass. Mixing can be accomplished by any suitable technique as long as adequate intimate mixing is achieved. Non-limiting examples of suitable mixing techniques include the use of a storage vessel, an agitated storage vessel, a simple "t-valve", any valve suitable for introducing one stream into another stream, or any other mixing apparatus known in the art that will provide substantially homogenous mixing of the aqueous hydrochloric acid and reaction mass.

After the aqueous hydrochloric acid and reaction mass have been intimately mixed, they are allowed to separate or caused to separate into an acidic aqueous phase comprising at least antimony halide catalyst residues and at least a portion, preferably substantially all, of the aqueous hydrochloric acid and an organic phase comprising brominated styrenic polymer. It should be noted that the organic phase also typically comprises at least a portion, preferably substantially all, of the organic solvent. It is preferred that the acidic aqueous phase and organic phase be caused to separate. The separation technique used is not critical to the instant invention and suitable separation techniques include centrifugation, decantation, and the like.

The acidic aqueous phase then undergoes a solvent exchange, under effective solvent exchange conditions, with an organic exchange solvent, thereby forming a solvent exchanged solution comprising antimony halide catalyst in the organic exchange solvent. This step is referred to herein as the "solvent exchange step". In other words, the antimony catalyst residues in the acidic aqueous phase are now contained in the organic exchange solvent, and can thus be used as a source of antimony halide catalyst in the bromination reaction zone.

Effective solvent exchange conditions include conditions under which at least about 50 vol. % of the aqueous hydrochloric acid present in the acidic aqueous phase is replaced by the organic exchange solvent, preferably at least about 75 vol. % and most preferably at least about 90 vol. %. In a most preferred embodiment, effective solvent exchange conditions are those conditions wherein substantially all of the aqueous hydrochloric acid is exchanged or replaced with the organic exchange solvent.

Preferred organic exchange solvents suitable for use herein are any of those solvents that are suitable for use as the organic solvent used in the bromination reaction zone. It is preferred that the organic exchange solvent be the same as the organic solvent as such facilitates the recycling of the antimony catalyst to the bromination reaction zone.

The solvent exchange step is typically carried out by conducting the acidic aqueous phase to a refluxing organic exchange solvent. Water and organic exchange solvent are removed from the system as an azeotrope, and the organic exchange solvent recycled back to the system. The removal of water is conducted until substantially all of the water has been removed. It should be noted that it is possible and within the realm of the present invention to remove at least a portion of any water present in the acidic aqueous phase before conducting the solvent exchange procedure by, for example, distillation.

The solvent exchange step results in the formation of a solvent exchanged solution comprising antimony halide catalyst and the organic exchange solvent. This solvent exchanged solution is suitable for use in the bromination reaction zone as a source of antimony halide catalyst therein, and can thus be recycled directly to the bromination reaction zone in an amount corresponding to the appropriate catalytic quantity of antimony-halide catalyst used therein, which is typically in the range of about 2 to about 10 wt. %, based on the weight of the styrenic polymer.

The inventors hereof have unexpectedly discovered that bromination processes using the above-described bromination step, extraction step, and solvent exchange step develop at least one antimony value that is insoluble in the aqueous hydrochloric acid selected from (i) antimony (IV) oxide, (ii) antimony (V) oxide, (iii) other antimony oxides, (iv) oxyhalide compounds, and mixtures of (i)-(iv). While not wishing to be bound by theory, the inventors hereof believe that the at least one insoluble antimony value is formed either during or after the solvent extraction step because they did not observe such value(s) prior to the extraction step. It should be noted that the inventors hereof, while not wishing to be bound by theory, believe that in preferred embodiments, the at least one insoluble antimony value is essentially antimony (IV) oxide, antimony (V) oxide, and mixtures thereof. Thus, in the practice of this embodiment of the present invention, HBr, preferably aqueous HBr, is added to the acidic aqueous phase at a point after the extraction step, thereby converting at least a portion of the at least one insoluble antimony value into at least one antimony value that is soluble in the hydrochloric acid. It is more preferred that the HBr be added to the acidic aqueous phase at a point after the extraction step but before the solvent exchange step. In a most preferred embodiment, the HBr is added to the acidic aqueous phase at a point between the extraction step and solvent exchange step.

Any gaseous HBr can be used in the present invention. Aqueous HBr suitable for use herein contains HBr in an amount ranging from about 10 wt % to about 48 wt %, based on the aqueous hydrobromic acid, preferably about 20 wt % to about 48 wt %.

The HBr is added in an amount ranging from about 0.1 to about 5 moles of HBr per mole of antimony present in the antimony halide catalyst used in the bromination reaction zone. In preferred embodiments, about 2.0 to about 3.0 moles of HBr per mole of antimony present in the antimony halide catalyst used in the bromination reaction zone is employed.

However, in one embodiment of the instant invention the acidic aqueous phase is concentrated in a "concentration step" after separation from the organic phase by removing at least a portion of the aqueous hydrochloric acid from the acidic aqueous phase thereby forming a concentrated acidic aqueous solution. Suitable concentration techniques include distilling, flashing, and the like with distilling being preferred.

After the acidic aqueous phase is concentrated, the concentrated acidic aqueous solution is then solvent exchanged, in a solvent exchange step. The solvent exchange step in this embodiment is conducted according to the procedure outlined above, and under the same conditions using the same second organic solvents as described above. The product obtained from solvent-exchanging the concentrated acidic aqueous solution can be recycled as a recycle stream comprising antimony halide catalyst in the organic exchange solvent.

Thus, after the solvent exchange, the recycle stream can be conducted to the bromination reaction zone to serve as a source of the antimony halide catalyst, as described above in relation to the solvent exchanged solution being conducted to the bromination reaction zone. In this embodiment HBr, in the amounts described above, including preferred amounts, is added to the acidic aqueous phase at a point selected from after the extraction step, after the concentration step, and combinations thereof. Thus, the HBr can be added to the acidic aqueous phase after the extraction step, or to the concentrated acidic aqueous phase formed during the concentration step, or combinations thereof. It should be noted that in some cases, the HBr can be added during the concentration step depending on the concentration equipment used, HBr concentration, and degree of concentration desired. In a preferred embodiment, the HBr is added to the acidic aqueous phase at a point after the extraction step but before the concentration step, i.e. between the extraction and concentration steps.

The above description is directed to several means for carrying out the present invention. Those skilled in the art will recognize that other means, which are equally effective, could be devised for carrying out the spirit of this invention. The following examples will illustrate the effectiveness of the present process, but are not meant to limit the present invention in any manner.

EXAMPLES

Example 1 (Comparative)

A 75-gram sample of a solution containing 12 mmol of antimony catalyst (1900 wppm antimony) in a 10-15% HCl aqueous hydrochloric acid was recovered from a bromination process in which the reaction mass was extracted with HCl. 51.2 grams of the hydrochloric acid was removed by placing the 75-gram sample in a 100 ml flask and heating with an electric mantle. The concentrated antimony-containing solution was then weighed, and the weight of the recovered solution was observed to be 23.7 grams.

The concentrated, recovered solution was then solvent exchanged with a two-neck 100 ml flask fitted with an additional funnel, a receiver, and a condenser on top of the receiver. 50 grams of ethylene dichloride ("EDC") was added to the flask and heated to reflux. Through the addition funnel, 19.6 grams of the concentrated solution was added dropwise to refluxing EDC over a 2-hour period. Water was removed and collected in the receiver as an azeotrope with the EDC. The EDC formed a separate phase in the receiver, and it was continually drained to the flask. After all 19.6 grams of the concentrated solution was added, the mixture in the flask was refluxed without returning "wet" EDC from the receiver. The contents of the flask were then examined, and it was determined that 33.5 grams of mixture was in the flask, and this mixture contained more than 1.2 grams of insoluble solids.

Example 2

An antimony recovery process according to the instant invention was then performed. A 75-gram sample of a solution containing 12 mmol antimony catalyst (1900 wppm antimony) in a 10-15% HCl aqueous hydrochloric acid was recovered from a bromination process in which the reaction mass was extracted with HCl, and placed in a 100 ml flask. 8.4 grams, 50 mmol, of 48 wt. % hydrobromic acid was then added to the solution, and the solution was then concentrated by removing 60.5 grams of the aqueous hydrochloric acid by heating the solution with an electric mantle. The concentrated solution remaining in the flask was determined to weigh 22.8 grams.

As in Example 1 above, the concentrated, recovered solution was then solvent exchanged with a two-neck 100 ml flask fitted with an additional funnel, a receiver, and a condenser on top of the receiver. 50 grams of ethylene dichloride ("EDC") was added to the flask and heated to reflux. Through the addition funnel, 22.8 grams of the concentrated solution was added drop-wise to the refluxing EDC over a 2-hour period. Water was removed and collected in the receiver as an azeotrope with EDC. The EDC formed a separate phase in the receiver, and it was continually drained to the flask. After all 22.8 grams of the concentrated solution was added, the mixture in the flask was refluxed without returning "wet" EDC from the receiver. The contents of the flask were then examined, and it was determined that 34.8 grams of mixture was in the flask, and this mixture contained no insoluble solids.

What is claimed is:

1. A process for brominating a styrenic polymer comprising:
    a) contacting, in a bromination reaction zone, in the presence of an antimony halide catalyst and an organic solvent under effective bromination conditions, a styrenic polymer with an effective amount of bromine chloride thereby forming a reaction mass comprising at least a brominated styrenic polymer and antimony halide catalyst residues;
    b) extracting at least a portion of the antimony catalyst residues from the reaction mass by contacting the reaction mass with an effective amount of aqueous hydrochloric acid thereby forming an acidic aqueous phase comprising antimony halide catalyst residues and aqueous hydrochloric acid and an organic phase comprising brominated styrenic polymer;
    c) separating the acidic aqueous phase and the organic phase;
    d) optionally, concentrating the acidic aqueous phase; and
    e) solvent exchanging under effective solvent exchange conditions the acidic aqueous phase with a solvent exchange solvent, thereby forming a solvent exchanged solution comprising antimony halide catalyst and the solvent exchange solvent,
       wherein HBr is added to the acidic aqueous phase at a point after the extraction step in an amount ranging from about 0.1 to about 5 moles of HBr per mole of antimony present in the antimony halide catalyst used in the bromination reaction zone thereby converting at least a portion of any insoluble antimony values into at least one antimony value that is soluble in the hydrochloric acid.

2. The process according to claim 1 wherein said effective bromination conditions include temperatures less than 100° C.

3. The process according to claim 1 wherein said effective bromination conditions include temperatures between about 0 and 75° C.

4. The process according to claim 2 wherein said effective bromination conditions include those conditions that result in about 2 to about 3.0 moles of bromine per mole of styrene units in the styrenic polymer.

5. The process according to claim 2 wherein said antimony halide catalysts are selected from antimony (III) halide, antimony (IV) halide, antimony (V) halide catalysts, and mixtures thereof.

6. The process according to claim 5 wherein said antimony halide catalysts are selected from $SbCl_5$, $SbCl_3$, $SbBr_3$, $SbClBr_2$, $SbBr_2Cl$, and mixtures thereof.

7. The process according to claim 1 wherein the antimony halide catalyst is antimony tri-chloride.

8. The process according to claim 1 wherein at least one antimony value that is insoluble in the aqueous hydrochloric acid is formed either during or after the solvent extraction step, and said at least one antimony value insoluble in the aqueous hydrochloric acid is selected from (i) antimony (IV) oxide, (ii) antimony (V) oxide, (iii) other antimony oxides, (iv) oxyhalide compounds, and mixtures of (i)-(iv).

9. The method according to claim 8 wherein at least a portion of the at least one insoluble antimony value is reduced to antimony (III) oxides, halides, oxyhalides, and mixtures thereof.

10. The process according to claim 9 wherein said HBr is added to the acidic aqueous phase at a point between the extraction and solvent exchange step.

11. The process according to claim 8 wherein said HBr is aqueous HBr.

12. The process according to claim 1 wherein said organic solvent is selected from carbon tetrachloride, bromochloromethane, chloroform, 1,1,2,2-tetrachloroethane, methylene chloride, 1,1,2-trichloroethane, bromochloroethane, ethylene dichloride, the like, and mixtures thereof.

13. The process according to claim 11 wherein said organic solvent is ethylene dichloride.

14. The process according to claim 12 wherein said organic exchange solvent is selected from carbon tetrachloride, chloroform, bromochloromethane, 1,1,2,2-tetrachloroethane, methylene chloride, 1,1,2-trichloroethane, 1,2-dibromoethane, ethylene dichloride, bromochloroethane, the like, and mixtures thereof.

15. The process according to claim 12 wherein said organic exchange solvent is the same as said first organic solvent.

16. The process according to claim 13 wherein said organic exchange solvent is ethylene dichloride.

17. The process according to claim 1 wherein said effective solvent exchange conditions include those conditions under which at least about 50 vol. % of the hydrochloric acid in the acidic aqueous phase is replaced by the organic exchange solvent.

18. The process according to claim 1 wherein said solvent exchanging comprises:
   a) contacting said acidic aqueous phase with said organic exchange solvent, wherein said organic exchange solvent is refluxing;
   b) removing water as an azeotrope with the organic exchange solvent; and
   c) recovering a solvent exchanged solution comprising antimony halide catalyst and organic exchange solvent.

19. The process according to claim 17 wherein said process further comprises:
   a. conducting said solvent exchanged solution comprising antimony halide catalyst and organic exchange solvent to the bromination reaction zone in an amount corresponding to about 2 to about 10 wt. % antimony halide catalyst, based on the weight of the styrenic polymer.

20. The process according to claim 1 wherein said process includes the step of concentrating the acidic aqueous phase.

21. The process according to claim 20 wherein said concentration step comprises:
   a. concentrating said acidic aqueous phase by removing at least a portion of said aqueous hydrochloric acid therefrom thereby forming a concentrated acidic aqueous solution.

22. The process according to claim 21 wherein said concentrated acidic aqueous solution is solvent exchanged by:
   a. solvent exchanging under effective solvent exchange conditions said concentrated acidic aqueous solution with an organic exchange solvent, thereby forming a recycle stream comprising antimony halide catalyst in said organic exchange solvent; and
   b. optionally conducting said recycle stream to the bromination reaction zone.

23. The process according to claim 21 wherein about 0.1 to about 5 moles of aqueous hydrobromic acid per mole of antimony present in the antimony halide catalyst used in the bromination reaction zone is added to the bromination process at a point in the process selected from after the extraction step, after the concentration step, and combinations thereof.

24. The process according to claim 23 wherein the HBr is added to the acidic aqueous phase at a point after the extraction step, or to the concentrated acidic aqueous phase formed during the concentration step at a point after the concentration step, or during the concentration step, or combinations thereof.

25. The process according to claim 21 wherein said aqueous hydrobromic acid is added to the acidic aqueous phase at a point between the extraction and concentration steps.

26. The process according to claim 21 wherein said recycle stream is conducted to the bromination reaction zone to be used as a source of antimony halide catalyst therein.

* * * * *